US010022738B2

(12) United States Patent
Pouliaude et al.

(10) Patent No.: US 10,022,738 B2
(45) Date of Patent: Jul. 17, 2018

(54) FLUID PRODUCT DISPENSER

(71) Applicant: APTAR FRANCE SAS, Le Neubourg (FR)

(72) Inventors: Florent Pouliaude, Fouqueville (FR); Emmanuel Vilain, Beaubray (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

(21) Appl. No.: 14/759,246

(22) PCT Filed: Jan. 9, 2014

(86) PCT No.: PCT/FR2014/050034
§ 371 (c)(1),
(2) Date: Jul. 6, 2015

(87) PCT Pub. No.: WO2014/108641
PCT Pub. Date: Jul. 17, 2014

(65) Prior Publication Data

US 2015/0352573 A1 Dec. 10, 2015

(30) Foreign Application Priority Data

Jan. 11, 2013 (FR) ..................................... 13 50257

(51) Int. Cl.
*G01F 11/28* (2006.01)
*B05B 11/00* (2006.01)
(Continued)

(52) U.S. Cl.
CPC ...... *B05B 11/3001* (2013.01); *B05B 11/0016* (2013.01); *B05B 11/3049* (2013.01);
(Continued)

(58) Field of Classification Search
CPC ............ B05B 11/3001; B05B 11/0016; B05B 11/3049; B05B 15/005; B05B 15/007;
(Continued)

(56) References Cited

U.S. PATENT DOCUMENTS 3,053,459 A * 9/1962 Corsette ............. B05B 11/3001 222/385
4,801,049 A * 1/1989 Thompson .......... B05B 11/0027 222/179.5
(Continued)

FOREIGN PATENT DOCUMENTS

DE 3 710 788 A1 11/1988
DE 3710788 A1 * 11/1988 ........... B05B 7/0416
(Continued)

OTHER PUBLICATIONS

DE3710788—English Translation, machine generated, May 2016.*
(Continued)

*Primary Examiner* — Benjamin R Shaw
(74) *Attorney, Agent, or Firm* — Sughrue Mion, PLLC

(57) ABSTRACT

A fluid dispenser device comprising:
- a reservoir (1) including a neck (12);
- a dispenser member (2) that is mounted in the neck (10), the dispenser member (2) being provided with a dip tube (23); and
- a cover tube (5) that surrounds said dip tube (23);
- the fluid dispenser device being characterized in that, in the proximity of its connection top end (52), said cover tube (5) includes at least one vent (55) having a total flow section (St) that presents a size that is sufficient to enable the fluid to rise in the cover tube (5) while the cover tube is being inserted quickly into the fluid reservoir (1) in the filled state, without being significantly disturbed by the air that is evacuated from the cover tube (5) through said at least one vent (55).

19 Claims, 2 Drawing Sheets

(51) Int. Cl.
*B05B 15/00* (2018.01)
*B65D 83/32* (2006.01)

(52) U.S. Cl.
CPC .......... *B05B 15/005* (2013.01); *B05B 15/007* (2013.01); *B65D 83/32* (2013.01); *Y10T 29/49828* (2015.01)

(58) Field of Classification Search
CPC ........... B05B 11/3045; Y10T 29/49828; B65D 83/32; B65D 2231/004; B65D 2588/545; B67D 1/0802; B67D 2001/0824; B67D 2001/0825; B67D 3/0064; F17C 2223/045; F17C 2223/047; F17C 2225/047; G01F 11/028
USPC ................ 222/464.1, 211, 382, 464.7, 321.5
See application file for complete search history.

(56) References Cited

U.S. PATENT DOCUMENTS

| | | | | | |
|---|---|---|---|---|---|
| 5,160,072 | A * | 11/1992 | Nye | B65D 83/0061 | 222/463 |
| 5,769,274 | A * | 6/1998 | Behar | B05B 11/0016 | 222/105 |
| 6,119,897 | A * | 9/2000 | Boileau | B05B 11/3042 | 222/382 |
| 2006/0118579 | A1* | 6/2006 | Milian | B05B 11/3042 | 222/321.9 |
| 2011/0049191 | A1* | 3/2011 | Crawford | B05B 15/005 | 222/382 |
| 2012/0104049 | A1* | 5/2012 | Choquart | B05B 11/0016 | 222/321.9 |

FOREIGN PATENT DOCUMENTS

| | | |
|---|---|---|
| FR | 2 877 324 A1 | 5/2006 |
| FR | 2 966 808 A1 | 5/2012 |
| FR | 2 970 474 A1 | 7/2012 |

OTHER PUBLICATIONS

International Preliminary Report on Patentability dated Jul. 16, 2015 from the International Bureau in counterpart International Application No. PCT/FR2014/050034.

International Search Report for PCT/FR2014/050034 dated Apr. 24, 2014.

* cited by examiner

FLUID PRODUCT DISPENSER

CROSS REFERENCE TO RELATED APPLICATIONS

This application is a National Stage of International Application No. PCT/FR2014/050034 filed Jan. 9, 2014, claiming priority based on French Patent Application No. 13 50257, filed Jan. 11, 2013, the contents of all of which are incorporated herein by reference in their entirety.

The present invention relates to a fluid dispenser comprising: a fluid reservoir including a neck that defines an opening; a dispenser member, such as a pump, that is mounted in the opening of the neck, said dispenser member being suitable for delivering a quantity of fluid contained in said fluid reservoir, the dispenser member being provided with a dip tube that extends into the fluid reservoir so as to convey the fluid contained in the fluid reservoir to the dispenser member as a result of the dispenser member being actuated; and a cover tube that surrounds said dip tube at least in part, the cover tube including a free bottom end and a connection top end that is secured to a support element. Such a dispenser finds an advantageous application in the field of perfumery, but also applies to the fields of cosmetics and pharmacy.

Figure 1:
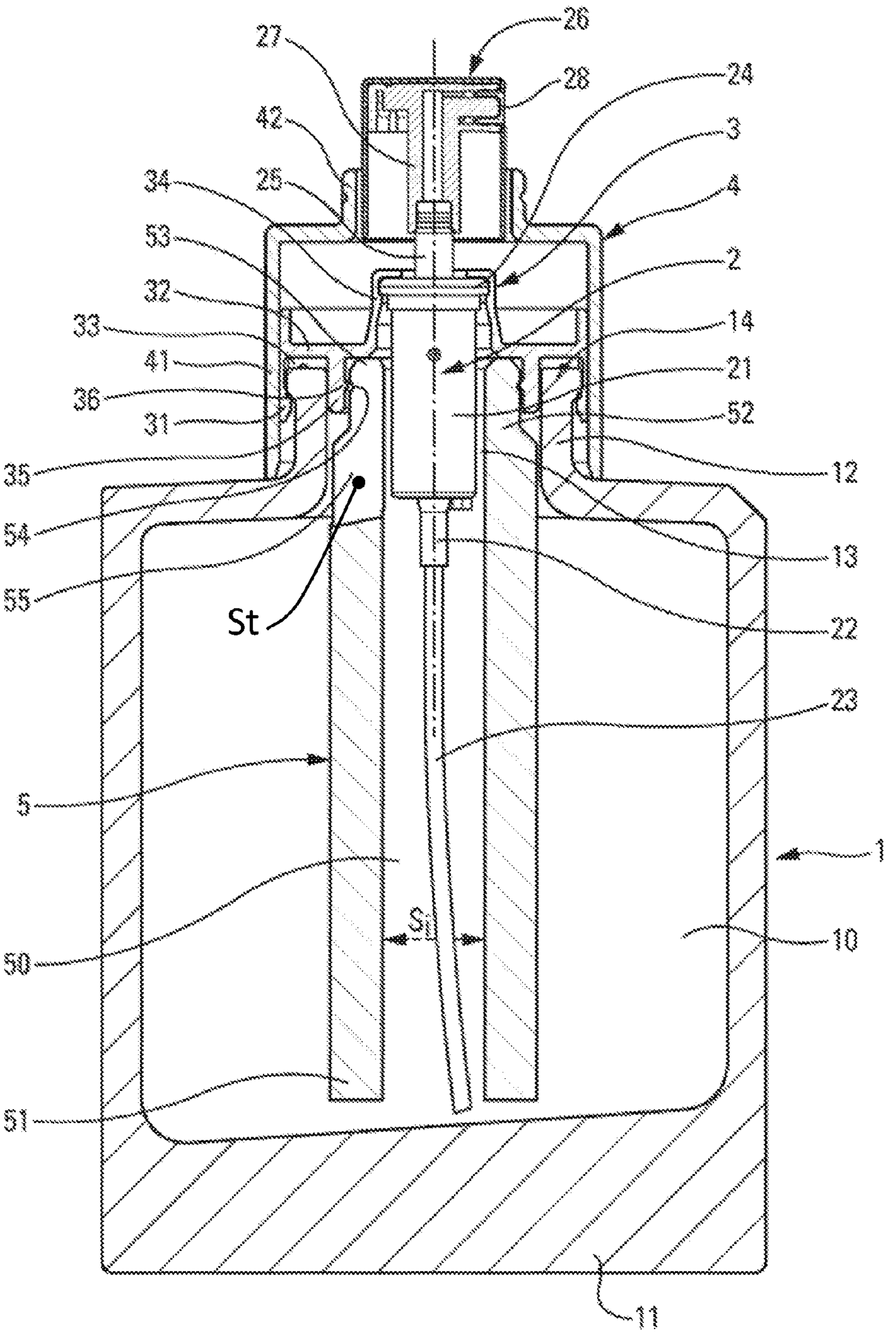

In the prior art, document FR 2 776 627 is already known that describes a dispenser of this type. The cover tube that surrounds the dip tube is snap-fastened inside a support element that extends around the pump and that includes an outer shoulder that bears against the top edge of the neck of the reservoir. The top end of the cover tube is engaged around the inlet sleeve of the pump, in which sleeve the dip tube is engaged. A small annular gap is defined between the top end of the cover tube and the connection sleeve of the dip tube. In addition, it should also be observed that the cover tube, together with the support element, presents an outside diameter that corresponds approximately to the inside diameter of the neck, such that the cover tube and its support element occupies a large volume in the reservoir. With reference to FIG. 1, for example, in document FR 2 776 627, the cover tube and its support element could be considered as occupying approximately one third of the working volume of the reservoir.

Document FR 2 877 324 describes another dispenser that includes a cover tube that is engaged around the dip tube. The cover tube is fastened on the connection sleeve of the dip tube. The outside diameter of the cover tube corresponds substantially to the inside diameter of the neck of the reservoir, such that the dip tube also occupies a large portion of the reservoir.

Document FR 2 966 808 describes still another dispenser that includes a cover tube that extends around the dip tube. The cover tube is mounted on a support bushing that bears against the top edge of the neck. A vent hole is provided in the support bushing so as to make it possible to vent the reservoir through the pump on each actuation. Here again it should be observed that the outside diameter of the cover tube corresponds substantially to the inside diameter of the neck of the reservoir, such that the cover tube occupies a large portion of the working volume of the reservoir.

While the dispenser is being assembled, the sub-assembly constituted by the pump, its fastener ring, its pusher, its dip tube, its cover tube, and optionally its support element, is mounted on the reservoir that has been pre-filled with fluid. During this assembly operation, the cover tube is inserted through the neck of the reservoir and moved downwards towards the bottom wall of the reservoir. When the total volume of the cover tube is considerable, as in the prior-art documents, inserting the cover tube quickly into the filled reservoir causes the fluid inside the reservoir to be disturbed. The fluid level rises in the reservoir, and its surface is agitated in such a manner that splashes of fluid can escape from the neck and soil the outside of the reservoir. This is not acceptable. In most configurations, the cover tube defines an empty internal volume within which the dip tube and a portion of the pump extend. When the cover tube is inserted into the filled reservoir, the fluid cannot rise inside the cover tube, or at least not quickly enough, such that the fluid level in the reservoir rises very quickly and can overflow via the neck.

An object of the present invention is to remedy the above-mentioned drawbacks of the prior art by defining a dispenser such that quick insertion of its cover tube in the filled reservoir minimizes the extent to which the fluid is disturbed, and reduces the extent to which the fluid level rises in the reservoir. Another object of the present invention is to fill the empty internal volume defined inside the cover tube as quickly as possible.

To achieve these objects, the present invention proposes that, in the proximity of its connection top end, said cover tube includes at least one vent having a total flow section that presents a size that is sufficient to enable the fluid to rise in the cover tube while the cover tube is being inserted quickly into the fluid reservoir in the filled state, without being significantly disturbed by the air that is evacuated from the cover tube through said at least one vent. The function of the vent(s) is not to put the inside of the reservoir into communication with the outside, but to put the inside of the cover tube into communication with the outside during the operation of assembling the dispenser. It is difficult, or even impossible, to determine, with accuracy, the structural size needed for the vents in order to enable the cover tube to be inserted quickly without the fluid being significantly disturbed: specifically, the size of the vents depends on the total volume of the cover tube, on its empty internal volume, on its configuration, on the capacity of the reservoir, and on the configuration of the reservoir. However, the person skilled in the art, with knowledge of all of the above-mentioned parameters, can easily determine the minimum size needed for the vents in order to guarantee that the air held captive inside the cover tube is evacuated quickly. Purely by way of indication, the cover tube defines an internal flow section, and the total flow section may lie in the range one half to three times the internal flow section. Ideally, the total flow section is of the same order as the internal flow section. Here again, it should be emphasized that the size of the vents is difficult to determine with accuracy, but that the person skilled in the art can intuitively determine the size needed for the holes in order to guarantee the desired function, namely to evacuate the air present inside the cover tube quickly.

According to an advantageous characteristic of the invention, the vent is arranged in the neck at least in part. In this way, the vents are barely visible, since they are masked by the neck.

In another advantageous aspect of the invention, the connection top end defines a top annular edge, the vent extending up to the top annular edge. In other words, each vent is in the form of a slot, notch, or scallop that extends axially in the wall thickness of the cover tube from its top annular edge. Advantageously, the cover tube includes a plurality of vents so as to form a plurality of end segments that present radial springiness, the end segments including snap-fastener profiles that co-operate with the support element. The cover tube may thus be snap-fastened easily around, or inside, its support element. In this way, the vents make it possible to impart an additional function of resilient snap-fastening.

In another aspect of the invention, the cover tube presents an outside diameter that is a little smaller than the inside diameter of the neck. This means that the cover tube occupies a large volume of the reservoir and intrinsically defines a significant empty internal volume, which is why the present invention is advantageous.

According to another characteristic of the invention, an annular gap is defined between the dispenser member and the cover tube, such that the dispenser member communicates directly with the fluid reservoir through the cover tube.

In a practical embodiment of the invention, the dispenser member is mounted in the neck by means of a fastener ring that forms the support element for supporting the cover tube, the support element extending into the neck. Advantageously, the connection top end of the cover tube is engaged inside the support element, the cover tube not being in contact with the dispenser member. Advantageously, the support element is in leaktight engagement inside the neck. The support element may thus perform the function of a self-sealing lip providing sealing with the inside of the neck, such that there is no need for a neck gasket.

The spirit of the invention resides in guaranteeing that the air present inside the cover tube is evacuated quickly while said cover tube is being inserted quickly into a filled reservoir, so as to disturb the fluid present in the reservoir as little as possible. The fluid may thus rise very quickly inside the cover tube, such that the disruption that it causes comes only from the volume of the material of the cover tube. Cover holes that impart a resilient snap-fastening function is a particularly advantageous additional characteristic.

The present invention also provides a method of mounting a dispenser as defined above, wherein:

- the reservoir is initially filled with fluid up to the proximity of the neck; and
- the cover tube is immersed quickly into the fluid of the reservoir through the neck, the fluid rising in the cover tube while the air initially present in the cover tube escapes through the vent, such that the top level of the fluid inside the cover tube always remains substantially the same as outside the cover tube.

Once mounted, the top level of the fluid is situated in the direct proximity of the neck.

The invention is described more fully below with reference to the accompanying drawings which show two embodiments of the invention by way of non-limiting example.

Figure 2A:
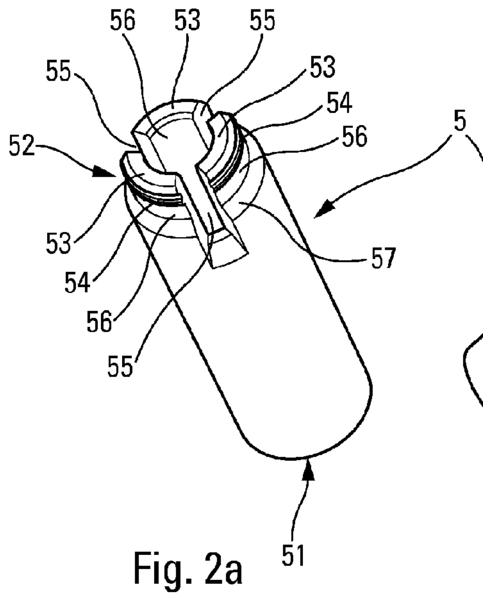
Figure 2B:
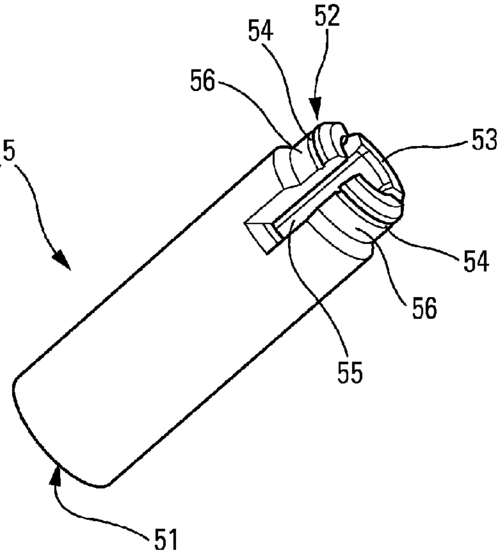
Figure 3A:
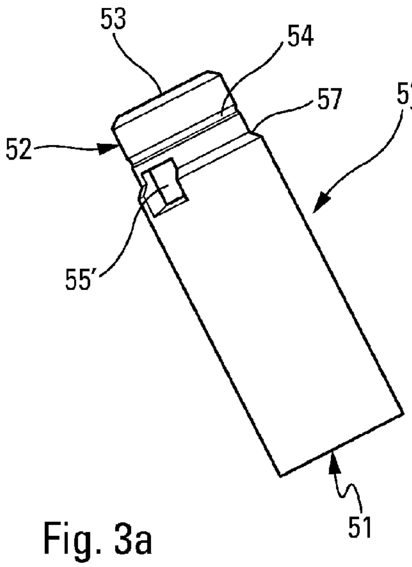
Figure 3B:
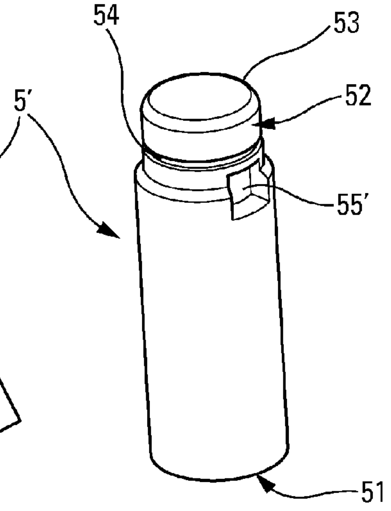

In the figures:

FIG. 1 is a vertical section view through a fluid dispenser in a first embodiment of the invention;

FIGS. 2*a* and 2*b* are perspective views of a cover tube in the first embodiment of the invention; and FIGS. 3*a* and 3*b* are likewise perspective views of a cover tube but in a second embodiment of the invention.

Reference is made firstly to FIG. 1 in order to describe in detail the structure of a fluid dispenser of the invention. It comprises the following component elements, namely a fluid reservoir 1, a dispenser member 2, a fastener ring 3, a hoop 4, and a cover tube 5.

The fluid reservoir 1 may be of design that is entirely conventional, including a bottom wall 11 and a neck 12 that defines an opening 13 that puts the inside 10 of the reservoir into communication with the outside. In the embodiment shown in FIG. 1, the neck 12 extends from a shoulder, such that the opening 13 defines a constricted passage. The top end of the neck 12 defines an annular edge 14. The reservoir 1 can be made from any appropriate material, such as glass or plastics material, and it is preferably transparent so that its contents can be seen. The reservoir is preferably rigid and non-deformable.

The dispenser member 2 may be a valve, and preferably a pump. The dispenser member 2 comprises a body 21 that is provided at its bottom end with an inlet sleeve 22 to which there is connected a dip tube 23 that extends inside the reservoir into the proximity of its bottom wall 11. At its top end, the body 21 defines a mounting collar 24. The dispenser member 2 also comprises an actuator rod 25 that is axially movable down and up inside the body 21. Although not shown, a pump chamber that is provided with an inlet valve and with an outlet valve is formed inside the body 21. Moving the actuator rod 25 causes the volume of the chamber to vary in such a manner as to control the opening and closing of the inlet and outlet valves selectively. This design is entirely conventional for a dispenser member, such as a pump, in the fields of perfumery, cosmetics, and pharmacy. The dispenser member 2 also comprises a pusher 26 that includes a connection sleeve 27 that is engaged on the free end of the actuator rod 25. The connection sleeve 27 leads to a dispenser orifice 28 that may be in the form of a spray nozzle, for example. By pressing on the pusher 26, the actuator rod 25 is driven into the body 21, and fluid under pressure is forced through the rod 25 to the dispenser orifice 28 where the fluid is dispensed in the form of a spray, for example. Here again, this design is entirely conventional.

The function of the fastener ring 3 is to hold the dispenser member 2 in stationary and leaktight manner on or in the neck 12 of the reservoir 1. The fastener ring 3 includes a fastener bushing 31 in engagement around the neck 12 of the reservoir. The bushing 31 may be formed with tabs that are separated by gaps, or, in a variant, the bushing may be continuous over its entire periphery. In conventional manner, the bushing 31 includes fastener profiles for coming into engagement with an annular reinforcement formed by the neck 12. The fastener ring 3 also includes a disk 32 that extends inwards from the bushing 31. The disk 32 may be used to flatten an annular neck gasket 33 against the annular edge 14 of the neck 12. However, the use of a gasket may be omitted, as described below. The fastener ring also includes a mounting housing 34 inside which the mounting collar 24 formed by the body 21 of the dispenser member 2 is received. The mounting housing 34 defines a central opening through which the actuator rod 25 extends. This design is entirely conventional for a fastener ring in the fields of perfumery, cosmetics, and pharmacy. In the invention, the fastener ring 3 further includes a support element 35 that is in the form of an annular lip that extends downwards from the disk 32. The support element 35 may be continuous over its entire periphery, or, on the contrary, it may extend in segments that are separated by slots. The support element 35 penetrates inside the neck 12, and may even come into leaktight contact inside the neck over its entire periphery. Thus, the neck gasket 33 may be omitted. The inside of the support element 35 forms a snap-fastener profile 36 that projects radially inwards. The support element 35 may extend over the entire height of the neck, or over a fraction only, as shown in FIG. 1.

The hoop 4 is engaged around the fastener ring 3, and more precisely is in clamping contact with the fastener bushing 31. The hoop 4 may participate in blocking the bushing 31 around the neck 12, particularly when the bushing is formed with tabs that are separated by slots. The hoop 4 is also used as a cover part that makes it possible to mask the fastener ring and the actuator rod 25. As can be seen in FIG. 1, the hoop 4 may even mask a portion of the pusher 26. At its bottom end, the hoop 4 may bear against the shoulder of the reservoir from which the neck 12 extends. Here again, this hoop is entirely conventional in the field of perfumery.

In the mounted state shown in FIG. 1, the body 21 of the dispenser member 2 extends, in part, inside the neck 12, with its dip tube 23 extending into the proximity of, or even in contact with, the bottom wall 11. The body 21 is surrounded by the support element 35 that is itself inserted inside the neck 12. A relatively large gap is defined between the support element 35 and the body 21 of the dispenser member 2. The gap is used to receive the top portion of the cover tube 5.

In the first embodiment of the invention, the cover tube 5 presents a configuration that is generally circularly cylindrical. However, without going beyond the ambit of the invention, the cover tube 5 may present a wide range of attractive shapes. The cover tube 5 includes a bottom end 51 that faces towards the bottom wall 11. In FIG. 1, the bottom end 51 extends into the proximity of the bottom wall 11 so as to surround almost all of the dip tube 23. The cover tube 5 also includes a top end 52 that is engaged inside the neck 12 and inside the support element 35. The annular edge 53 of the top end 52 may even come into abutment against the disk 32. Between the bottom and top ends 51, 52, the cover tube 5 defines an empty inside space 50 that, in this embodiment, is circularly cylindrical in shape, but that may present any shape or configuration. For the purpose of ease of explanation, the internal space 50 is completely circularly cylindrical and defines a flow section Si that is constant. The top end 52 includes an outer wall that is provided with a snap-fastener groove 54 for co-operating by snap-fastening with the snap-fastener bead 36 formed inside the support element 35. In this way, the cover tube 5 is mounted in stationary manner inside the support element 35. The abutment of the top edge 53 against the disk 32 may participate in fastening the cover tube 5, and above all in fastening it in stable manner. The springiness needed to enable snap-fastening may be imparted by the support element 35 or by the cover tube 5.

In the invention, the cover tube 5 is provided with at least one vent 55 at its top end 52. Preferably, a plurality of vents 55 are provided that are distributed over the periphery of the cover tube 5. With reference to FIGS. 2*a* and 2*b*, it can be seen that the top end 52 of the cover tube 5 is provided with three vents 55 that are distributed in equidistant manner. In this embodiment, the holes extend from the top edge 53, axially downwards over a certain height. The vents 55 are thus in the form of slots, scalloping, or notches that open upwards and that define between them end segments 56 that are each provided on their outer wall with a snap-fastener groove segment 54. As a result of the presence of the vents 55, the end segments 56 present radial springiness that is useful for snap-fastening the cover tube 5 in the support element 35, particularly when said support element is made in rigid manner. Specifically, when the support element 35 is continuous over its entire periphery and also performs the function of a sealing lip in leaktight contact with the inside of the neck 12, it cannot present any springiness. As a result, the springiness needed for snap-fastening must be imparted by the cover tube, and this springiness is possible as a result of the presence of the vents 55 that impart radial springiness to the end segments 56.

As can be seen in FIG. 1, the vents 55 extend axially downwards, well below the support element 35, so as to define a flow section that puts the inside space 50 into communication with the outside. Assuming that together the vents 55 define a total flow section St, the present invention provides for the total section St to be sufficient to enable the fluid to rise in the inside space 50 of the cover tube, while the cover tube is being inserted quickly into a fluid-filled reservoir. The rise of the fluid in the cover tube should take place without being significantly disturbed by the air that is present in the inside space 50, and that is evacuated from the cover tube through the vents 55. In other words, the vents 55 should not create head losses for the air that is evacuated therethrough, even when the dip tube is plunged very quickly into the fluid contained in the reservoir, as occurs while the dispenser is being assembled. In order to give a very general order of magnitude, it is possible to define the total flow section St of the vents as corresponding approximately to one half to three times the internal flow section Si of the inside space 50. It should be observed in empirical manner that the total flow section St may be of the same order as the internal flow section Si. Given that the total flow section St is a function of numerous parameters, such as the total volume of the cover tube, its proportion relative to the reservoir, the configuration of the reservoir, and the quantity of fluid contained in the reservoir, for example, it is practically impossible to determine, with accuracy, a universal value for the total flow section St. The person skilled in the art is capable of determining, for each application, the minimum or ideal value for the flow section St as a function of the available parameters.

In FIG. 1, it should be observed that the outside diameter of the cover tube 5 is a little less than the inside diameter of the neck 12. As a result, the total volume occupied by the dip tube, including the inside space 50, corresponds approximately to one third of the total working volume 10 of the reservoir 1. It should also be observed that the cover tube 5 is not in contact with the body 21 of the dispenser member 2, but, on the contrary, defines an annular gap 15 so that the body 21 communicates directly with the reservoir through the cover tube 5.

FIGS. 3*a* and 3*b* show the second embodiment of the invention, which differs from the first by the fact that the vents 55' do not extend up to the top annular edge 53. The holes 55' are still defined at the top end of the cover tube 5' and together they define a total flow section St that presents the same properties and advantages as the holes 55 of the first embodiment. Provision could be made for a single hole 55', or for two, three, four, or more. It is not necessary for the holes 55' to be situated in the direct proximity of the top annular edge 52: it suffices that they are situated at, or in the proximity of, the top end 52 so that they are not closed by the fluid while the cover tube is being inserted into the fluid-filled reservoir. By way of example, the vents 55' may be formed just below the snap-fastener groove 54 that co-operates with the snap-fastener bead 36 of the support element 35. As with the holes 55, the holes 55' may extend into an outer shoulder 57 that increases the outside diameter of the dip tube on going downwards. Naturally, this second embodiment does not enable the top end 52 to be radially springy and to enable snap-fastening in a rigid support element. With this second embodiment, it is preferable for the support element 35 to be radially deformable.

In both embodiments, the total combined flow section St enables the air present in the inside space 50 to be evacuated quickly and substantially without any head loss while the fluid is rising quickly in the cover tube when it is plunged into the fluid contained in the reservoir. It should be kept clearly in mind that the function of the vents is not to put the inside 10 of the reservoir into communication with the outside: on the contrary, the vents put the inside of the dip tube into communication with the outside merely to enable the air contained in the cover tube to be evacuated quickly. It can be said that while the cover tube is being immersed quickly into the fluid, the top level of the fluid inside the cover tube always remains substantially the same as outside the cover tube as a result of the air present in the cover tube being able to escape through the vents, without any being retained, as a result of the holes being appropriately sized. Preferably, the reservoir is filled with fluid up to the neck or into the direct proximity of the neck.

The invention claimed is:

1. A fluid dispenser comprising:

a fluid reservoir including a neck that defines an opening;

a dispenser member that is mounted in the opening of the neck, said dispenser member being suitable for delivering a quantity of fluid contained in said fluid reservoir, the dispenser member being provided with a dip tube that extends into the fluid reservoir so as to convey the fluid contained in the fluid reservoir to the dispenser member as a result of the dispenser member being actuated; and a cover tube that surrounds said dip tube at least in part, the cover tube including a free bottom end and a connection top end that is secured to a support element;

wherein, in proximity of the connection top end, said cover tube includes at least one vent having a total flow cross sectional area that presents a size that is sufficient to enable the fluid to rise in the cover tube while the cover tube is being inserted into the fluid reservoir in the filled state, so as to reduce a displacement of fluid outside of the cover tube of the fluid in the reservoir as compared to a displacement of fluid outside of the cover tube from a comparative cover tube identical to said cover tube but lacking said at least one vent, the reduction in displacement of the fluid being a result of the air that is evacuated from the cover tube through said at least one vent as the cover tube is inserted into the fluid reservoir; and wherein the connection top end defines a top annular edge, the vent opening along at least a portion of an outer peripheral surface of the cover tube and extending up to the top annular edge.

2. The dispenser according to claim 1, wherein the cover tube defines an internal flow cross sectional area at an end opposite the vent, and the total flow cross sectional area lies in the range of one half to three times the internal flow cross sectional area.

3. The dispenser according to claim 1, wherein the total flow cross sectional area is approximately the same size as an internal flow cross sectional area inside the cover tube.

4. The dispenser according to claim 1, wherein the cover tube includes a plurality of vents so as to form a plurality of end segments that present radial springiness, the end segments including snap-fastener profiles that co-operate with the support element.

5. The dispenser according to claim 1, wherein the cover tube presents an outside diameter that is a little smaller than the inside diameter of the neck.

6. The dispenser according to claim 1, wherein an annular gap is defined between the dispenser member and the cover tube, such that the dispenser member communicates directly with the fluid reservoir through the cover tube.

7. The dispenser according to claim 1, wherein the dispenser member is mounted in the neck by a fastener ring that forms the support element for supporting the cover tube, the support element extending into the neck.

8. A dispenser according to claim 7, wherein the connection top end of the cover tube is engaged inside the support element, the cover tube not being in contact with the dispenser member.

9. A dispenser according to claim 7, wherein the support element is in leaktight engagement inside the neck.

10. The dispenser according to claim 1, wherein the dispenser member is a pump.

11. The dispenser according to claim 1, further comprising a dispenser orifice through which the quantity of fluid contained in the fluid reservoir is dispensed, such that upon actuation of the dispenser member, the fluid in the reservoir that is dispensed from the dispenser orifice first enters through a free bottom end of the dip tube.

12. The dispenser according to claim 1, further comprising a dispenser orifice through which the quantity of fluid contained in the fluid reservoir is dispensed, and wherein, in an assembled operational state of the dispenser, the at least one vent is not in fluid communication with the dispenser orifice independently of the dip tube.

13. The dispenser according to claim 12, wherein upon actuation of the dispenser member, only fluid entering through the dip tube is dispensed from the dispenser orifice.

14. The dispenser according to claim 1, wherein the cover tube has an outer peripheral wall between the free bottom end and the connection top end, and wherein the vent is through the peripheral wall.

15. A method of mounting a dispenser, the fluid dispenser comprising:

a fluid reservoir including a neck that defines an opening;

a dispenser member that is mounted in the opening of the neck, said dispenser member being suitable for delivering a quantity of fluid contained in said fluid reservoir, the dispenser member being provided with a dip tube that extends into the fluid reservoir so as to convey the fluid contained in the fluid reservoir to the dispenser member as a result of the dispenser member being actuated; and a cover tube that surrounds said dip tube at least in part, the cover tube including a free bottom end and a connection top end that is secured to a support element;

wherein, in proximity of the connection top end, said cover tube includes at least one vent having a total flow cross sectional area that presents a size that is sufficient to enable the fluid to rise in the cover tube while the cover tube is being inserted into the fluid reservoir in the filled state, so as to reduce a displacement of fluid outside of the cover tube of the fluid in the reservoir as compared to a displacement of fluid outside of the cover tube from a comparative cover tube identical to said cover tube but lacking said at least one vent, the reduction in displacement of the fluid being a result of the air that is evacuated from the cover tube through said at least one vent as the cover tube is inserted into the fluid reservoir; and wherein the method comprises the following steps:

the reservoir is initially filled with fluid up to the proximity of the neck; and the cover tube is immersed into the fluid of the reservoir through the neck, the fluid rising in the cover tube while the air initially present in the cover tube escapes through the vent, such that the top level of the fluid inside the cover tube always remains substantially the same as outside the cover tube.

16. The method according to claim 15 wherein the vent is arranged in the neck at least in part.

17. The method according to claim 15, wherein the dispenser member is a pump.

18. The method according to claim 15, wherein the cover tube has an outer peripheral wall between the free bottom end and the connection top end, and wherein the vent is through the peripheral wall.

19. The method according to claim 15, wherein the cover tube defines an internal flow cross sectional area at an end opposite the vent, and the total flow cross sectional area lies in the range of one half to three times the internal flow cross sectional area.

* * * * *